United States Patent
Mazarick

(10) Patent No.: US 9,479,475 B1
(45) Date of Patent: Oct. 25, 2016

(54) SYSTEM AND METHOD FOR IPV4 TO IPV6 TRANSITION RATHER THAN AN OUTAGE

(71) Applicant: Michael Emory Mazarick, Raleigh, NC (US)

(72) Inventor: Michael Emory Mazarick, Raleigh, NC (US)

(73) Assignee: Michael E. Mazarick, Raleigh, NC (US)

( * ) Notice: Subject to any disclaimer, the term of this patent is extended or adjusted under 35 U.S.C. 154(b) by 0 days.

(21) Appl. No.: 14/658,241

(22) Filed: Mar. 16, 2015

Related U.S. Application Data

(60) Provisional application No. 61/954,231, filed on Mar. 17, 2014.

(51) Int. Cl.
  *H04L 29/06* (2006.01)
  *H04L 29/12* (2006.01)

(52) U.S. Cl.
  CPC ......... *H04L 61/2007* (2013.01); *H04L 61/251* (2013.01); *H04L 69/167* (2013.01); *H04L 29/12349* (2013.01); *H04L 29/12358* (2013.01); *H04L 61/6086* (2013.01)

(58) Field of Classification Search
  CPC .............. H04L 29/12358; H04L 29/12971; H04L 61/251; H04L 61/6086; H04L 69/167
  See application file for complete search history.

(56) References Cited

U.S. PATENT DOCUMENTS

| | | | |
|---|---|---|---|
| 7,296,155 B1* | 11/2007 | Trostle | H04L 63/164 713/170 |
| 8,064,443 B2 | 11/2011 | Scudder | |
| 8,077,709 B2 | 12/2011 | Cai et al. | |
| 8,374,078 B2 | 2/2013 | Ballantyne et al. | |
| 8,451,750 B2 | 5/2013 | Ward et al. | |
| 8,484,715 B2 | 7/2013 | Liang | |
| 8,531,941 B2 | 9/2013 | Sajassi et al. | |
| 8,537,804 B2 | 9/2013 | Eriksson | |
| 8,544,081 B2 | 9/2013 | He et al. | |
| 8,554,925 B2 | 10/2013 | Horvath et al. | |
| 2003/0179742 A1* | 9/2003 | Ogier | H04L 1/1614 370/351 |
| 2005/0034131 A1* | 2/2005 | Deshpande | H04L 29/06 719/310 |
| 2005/0182829 A1* | 8/2005 | King | H04L 29/06 709/220 |
| 2007/0183404 A1* | 8/2007 | Hofer | H04L 45/04 370/352 |
| 2010/0223458 A1 | 9/2010 | McGrew | |
| 2012/0110210 A1* | 5/2012 | Huang | H04L 29/12358 709/246 |
| 2012/0275323 A1* | 11/2012 | Reznik | H04L 47/10 370/252 |
| 2013/0195113 A1 | 8/2013 | Kotha et al. | |
| 2013/0250770 A1 | 9/2013 | Zou et al. | |
| 2013/0254310 A1 | 9/2013 | Krywaniuk | |
| 2013/0254544 A1 | 9/2013 | Hjelm et al. | |
| 2013/0254555 A1 | 9/2013 | Green | |
| 2013/0254829 A1 | 9/2013 | Jakubowski et al. | |
| 2013/0254851 A1 | 9/2013 | Shannon | |
| 2013/0254889 A1 | 9/2013 | Stuntebeck | |
| 2013/0254898 A1 | 9/2013 | Sauve et al. | |
| 2013/0259067 A1 | 10/2013 | Agmon | |
| 2013/0311478 A1* | 11/2013 | Frett | H04H 60/64 707/741 |
| 2014/0196019 A1* | 7/2014 | Chen | G06F 9/4552 717/163 |

OTHER PUBLICATIONS

Wikipedia definition for Resource Public Key Infrastructure, searched on Sep. 16, 2015.*

* cited by examiner

*Primary Examiner* — Jeong S Park

(57) ABSTRACT

Disclosed is a system and method to provide a seamless transition to IPv6 from IPv4 rather than the outage that occurs presently. This system and method for transition to IPv6 also takes into consideration the application, which must also be migrated to IPv6. There are two types of applications available to the customer, those that he has source code for, and those that he doesn't. The disclosed system and method differentiates between the two automatically.

25 Claims, 15 Drawing Sheets

| 20 | 01 | 01 | 0D | B8 | : | - | - | - | - | : | 00 | 228 | 128 | 10 | 125 |

IPv6 address register

*gethostbyaddress128*

SYSTEM AND METHOD FOR IPV4 TO IPV6 TRANSITION RATHER THAN AN OUTAGE

CROSS REFERENCE TO RELATED APPLICATIONS

The present application claims the benefit of U.S. Provisional Patent Application No. 61/954,231 filed Mar. 17, 2014 by Michael E. Mazarick and entitled "System and Method for IPv4 to IPv6 Transition Rather Than Outage" which is incorporated herein by reference as if reproduced in its entirety.

BACKGROUND OF THE DISCLOSURE

This disclosure describes a system and method of providing for a controlled transition from IPv4 to IPv6 and the routing necessary to effect that transition.

In general, any time an IP address changes, there is initial outage while that change occurs. Disclosed is a system and method for allowing the IP address between IPv4 and IPv6 to change with a controlled transition rather than an undergoing an outage.

DETAILED DESCRIPTION

Figure 1A:
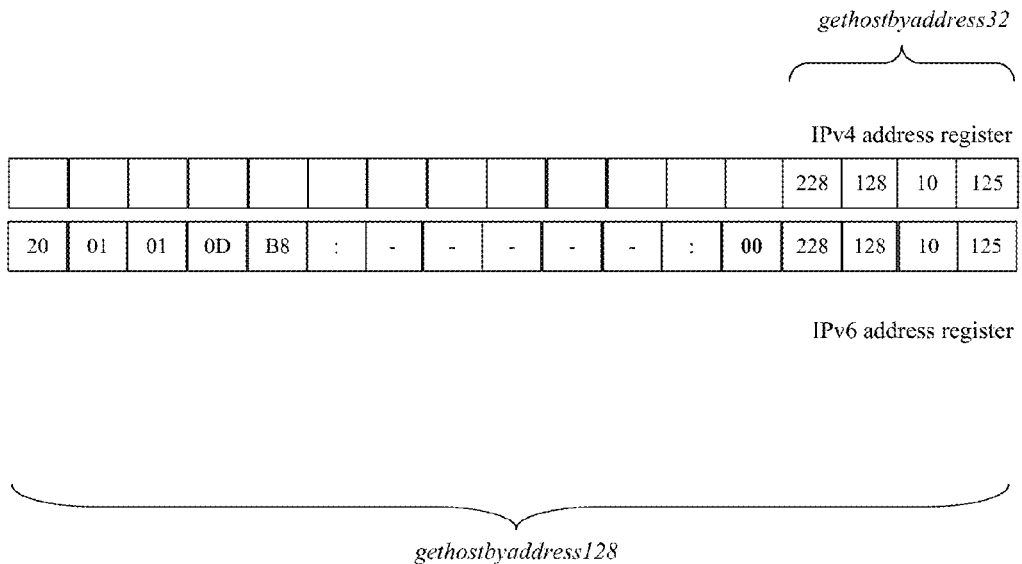
FIG. 1a IPv4 and IPv6 addresses are deployed at the same time in coordination with each other.

FIG. 1-4 discuss embodiments by which the transition from IPv4 to IPv6 can occur without an outage. An additional benefit occurs because after the transition is completed, the IPv4 addresses are available for re-allocation to a different network and a new customer. Even though IPv6 has been available for over a decade at the time of this patent application, there are separate processes in place for the allocation of IPv4 addresses and IPv6 addresses, such that there is no coordination of the deployment of IPv4 and IPv6 addresses. As a result, instead of a controlled smooth transition, there are inevitably outages as new IPs are migrated to the new IPv6 addressing standard. Although the drawings show the low order bits for alignment, the mask can be anywhere in the IPv6 address field. The low order bits are shown in the drawings for simplicity and understanding.

Though the concepts are simple to understand, there are many steps disclosed that are necessary to enable a smooth and orderly transition to IPv6 rather than an outage per IP deployment. In the claims and drawings, the major requirements of the present embodiment have been disclosed. The complex details underlying a successful IPv4 to IPv6 transition are "hidden" from the end network/customer but all of them are required to be implemented in the underlying infrastructure. The complexity and non-obviousness of the solution disclosed in this patent explains why this has not been achieved to date.

FIG. 1a. The first step, as disclosed in this description, requires that IPv4 and IPv6 addresses be available for allocation.

Figure 1B:
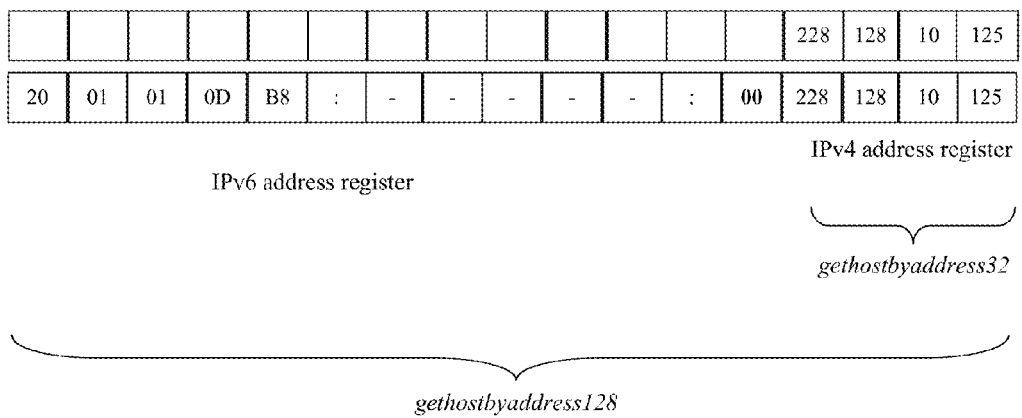
FIG. 1b IPv4 and IPv6 addresses are both still available, but the address register for IPv4 uses the IPv6 address (containing identical information) and both library calls ("gethostbyaddress128" and "gethostbyaddress32") utilize the IPv6 register.

FIG. 1b The second step is the allocation of both matching IPv4 and IPv6 address registers on a given network at the same time, as shown in FIG. 1a with the library call "gethostbyname32" available on the IPv6 address. The system and method which controls the sub-allocation of addresses ensures the matching of IPv4 and IPv6 addresses at a defined portion of the address field of IPv6. It doesn't have to be the low order bits. This explanation and drawings are shown for simplicity in the drawings. Other bits of the IPv6 address can be used besides the low order bits, but the drawings become very abstract.

Figure 2A:
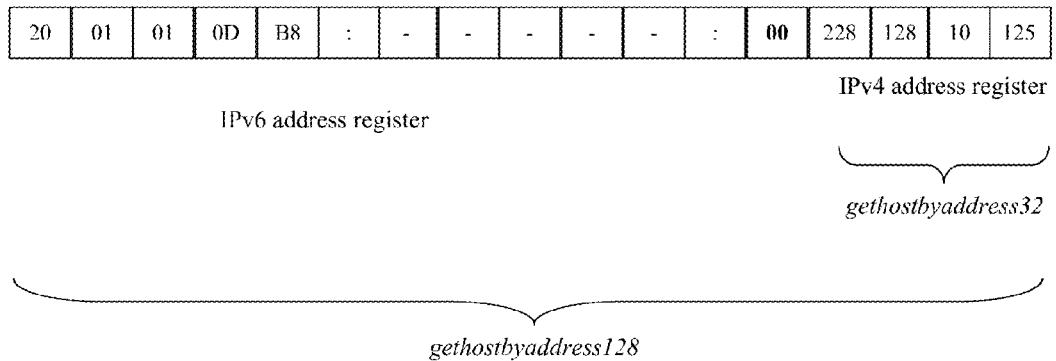
FIG. 2a The IPv6 address is solely available, but the application/system is able to use both IPv4 "gethostbyaddress32" and IPv6 "gethostbyaddress128" registers.

FIG. 2a The third step is the reallocation of the library "gethostbyaddress32" and the removal of the IPv4 address register from the IPv4 address to the matching IPv6 address register, as shown in FIG. 1b. This action is disclosed by claims indicating that control over the routing is essential. The routing information is also privately used to control where the library "gethostbyaddress" is located.

Figure 2B:
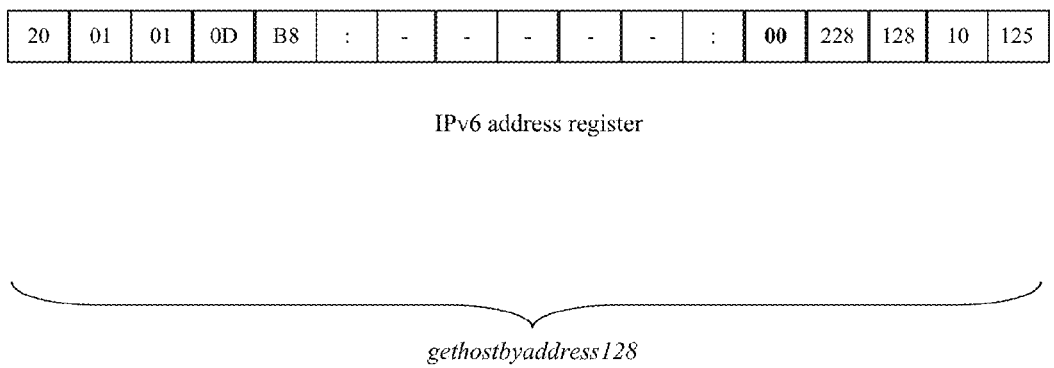
FIG. 2b The IPv6 address is solely available and the application(s) have been migrated to use the IPv6 "gethostbyaddress128" library. The IPv4 address is now available for re-use.

FIG. 2b The fourth step shows that eventually there will be only a gethostbyaddress128. This will take a very long time. There is a point of stability for the organization/customer, where all of the source code has been recompiled to use the new address IPv6 address, whatever binary substitutions can be made of the original IPv4 gethostbyaddress32. It is likely that very few companies will do this, particularly for free. It is more likely that companies will, on a case by case basis, make increased addressing available as a new release.

Figure 3A:
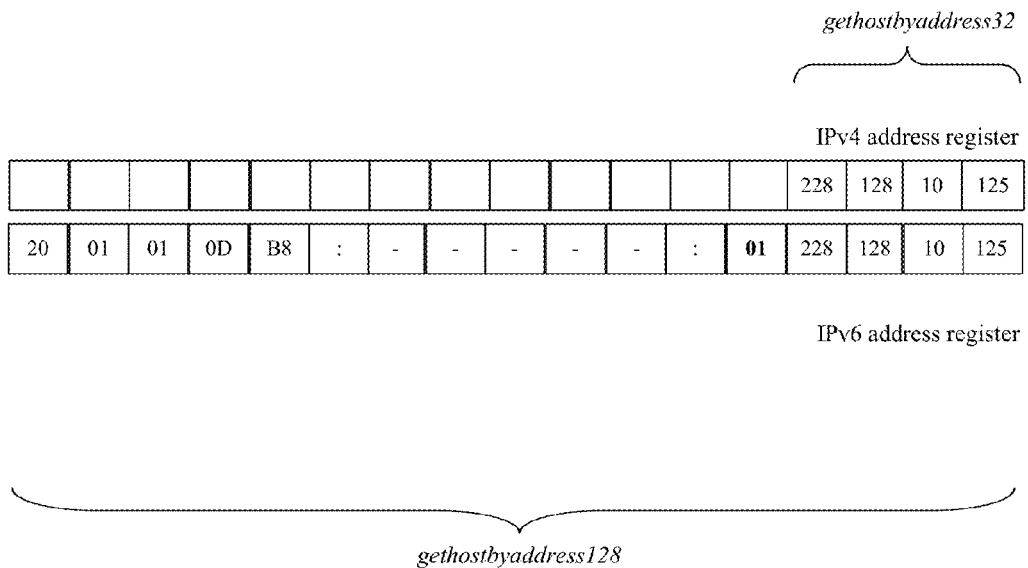
FIG. 3a The released IPv4 address is put to use on a new network (e.g. for a new customer) and a new IPv6 address is used.

FIG. 3a The drawing provides identical information as FIG. 1a, with one important distinction: the same IPv4 address has been recycled to a different private network and/or different customer by mapping it with a different IPv6 address. Each IPv4 address has multiple compatible IPv6 addresses. The number of times the IPv4 address can be recycled is dependent on an allocation of at least one IPv4 to many multiples of IPv6 addresses that are compatible. The multiple of IPv6 addresses governs and puts an upper limit on how many times a particular IPv4 address can be recycled to a new network. The number of IPv4 addresses available determines how many devices can undergo the transition at one time.

Figure 3B:
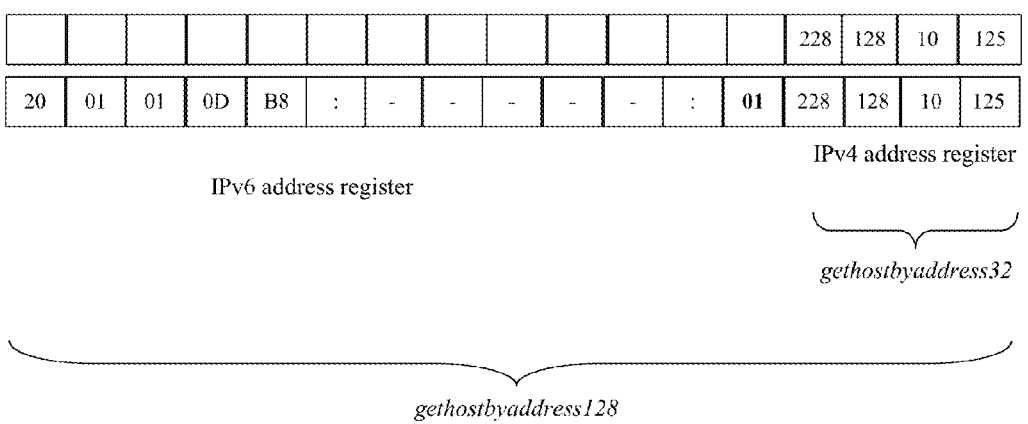
FIG. 3b The new IPv6 address and the original IPv4 address are still in place, but the management system is using the new IPv6 address FIG. 4a The new IPv6 address is using both IPv4 "gethostbyaddress32" and "gethostbyaddress128" library call with the new IPv6 address FIG. 4b The application(s) are migrated to the new IPv6 address and IPv6 "gethostbyaddress" library. The IPv4 address is freed up for re-use. The released IPv4 address is again put to use on a new network (e.g. for a new customer) and a new IPv6 address is used.

FIG. 3b The drawing is the allocation of both matching IPv4 and IPv6 addresses on a new network at the same time, as shown in FIG. 1a. The system and method which controls the sub-allocation of addresses ensures the matching of IPv4 and IPv6 addresses at a defined portion of the address field of IPv6. It doesn't have to be the low order bits. This explanation and drawings are shown for simplicity in the drawings. Other bits of the IPv6 address can be used besides the low order bits, but the drawings become very abstract.

Figure 4A:
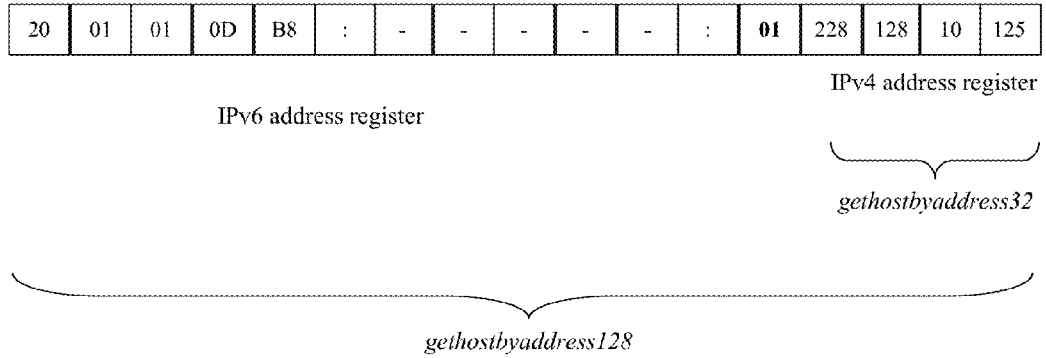

FIG. 4a The drawing is the reallocation of the library "gethostbyaddress32" from the IPv4 address to the matching IPv6 address, as shown in FIG. 2b and the removal of the IPv4 address register. This action is disclosed by claims indicating that control over the routing is essential. The routing information is also privately used to control where the library "gethostbyaddress32" is located.

Figure 4B:
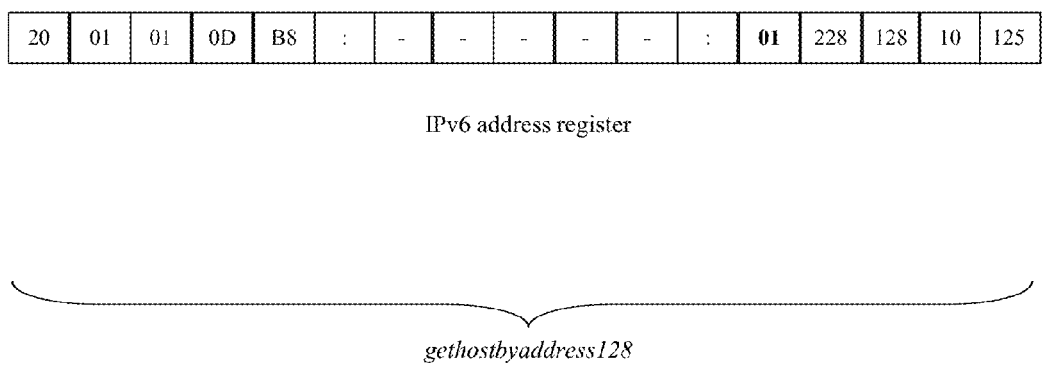

FIG. 4b The drawing shows that eventually there will be only a gethostbyaddress128. This will take a very long time. There is a point of stability for the organization/customer, where all of the source code has been recompiled to use the new address IPv6 address, whatever binary substitutions can be made of the original IPv4 gethostbyaddress32. It is likely that very few companies will do this, particularly for free. It is more likely that companies will, on a case by case basis, make increased addressing available as a new release.

Figure 5:
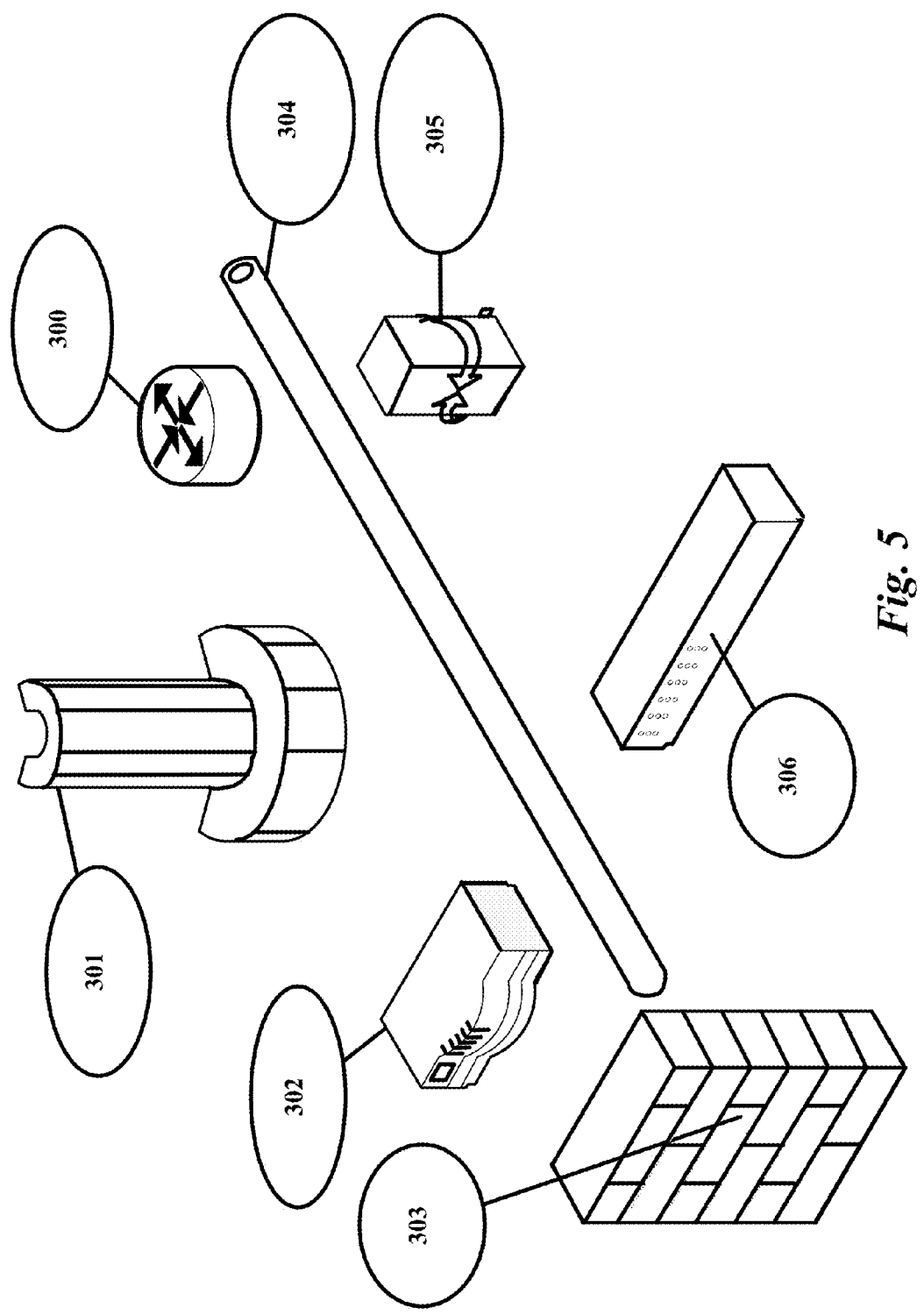
FIG. 5 shows the basic components that are needed by an Intranet Service Provider (ISP). The drawing illustrates a physical or virtual Core Router, a virtual Edge Router, a virtual Autonomous Number System Router, a physical or virtual Layer 2 switch, and a management system that can only be accessed thru a "virtual wire" thru the isolated unrouted network accessible only to the ISP. The ISP chooses the customers to expose the unrouted network that cannot be networked thru so the customers can create their own network components.

FIG. 5. FIG. 5 shows the basic components that are needed by an Intranet Service Provider (ISP). The primary components from a networking perspective are a management system to provide the necessary routing and control (identified as element 301), a Core router (physical or virtual) (identified as element 300), an edge router, physical or virtual (identified as element 302), a management lan network that individual customers cannot see or network thru to separate the ISP from their customer base (identified as element 304), and a firewall (identified as element 303). The standard solution actually calls for 3 firewalls per customer, 2 that the customer controls and one that they cannot see that keeps the management lan secure and customers isolated from each other. Management systems can be in different locations. Each location has to have at least one management system. It should be noted that core routers can only "talk" to other core routers (which are connected to each other but are not on the internet) or an edge router for internet bound traffic.

Figure 6:
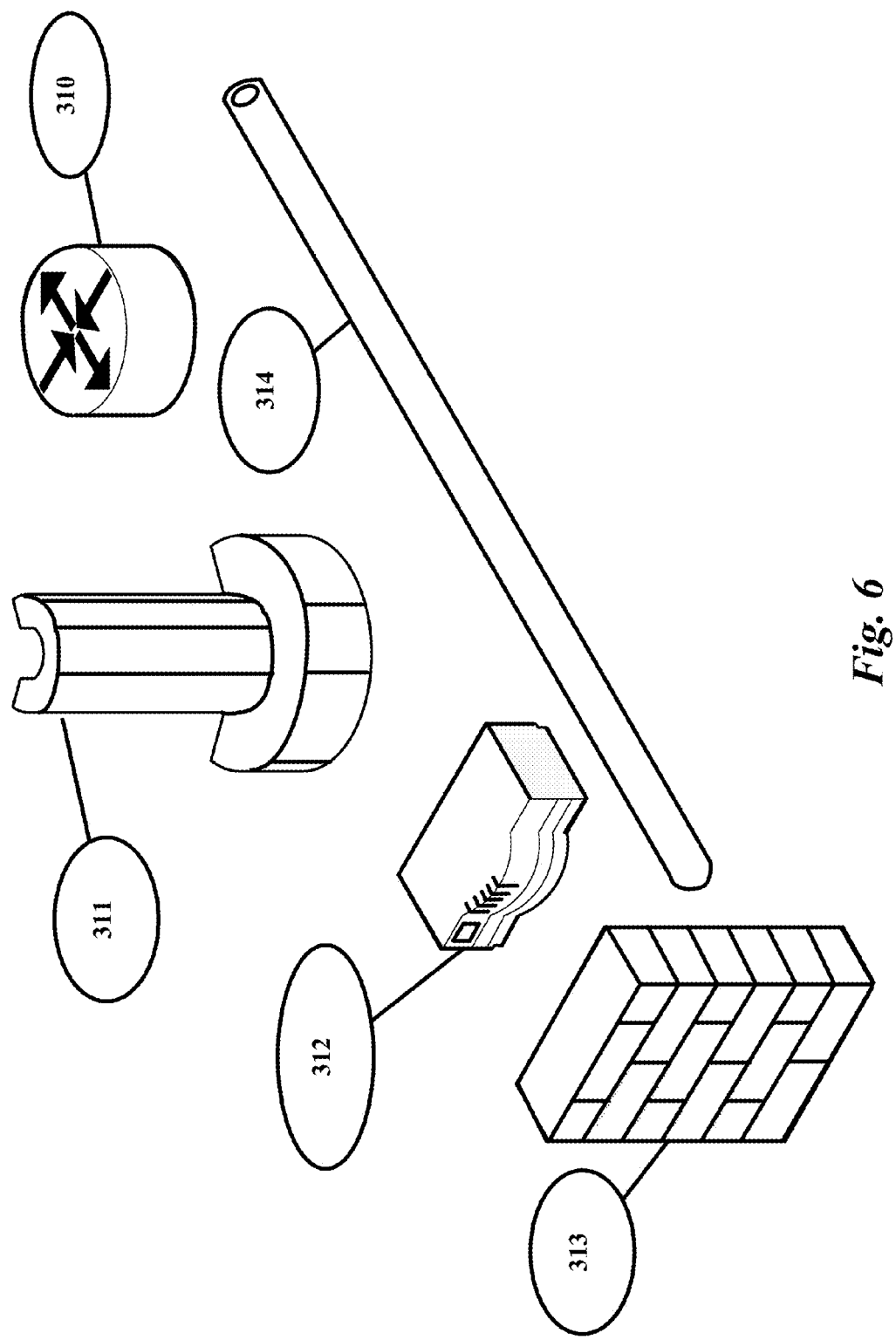
FIG. 6 This figure identifies key ISP networking components consisting of a firewall to keep customers from accessing each other's data, a management lan that consists of an isolated non-routing network that is a "virtual wire" between the management system and the physical equipment, a management system that is only accessible thru the isolated, non-routing network, a physical or virtual Core Router, and a physical or virtual edge router.

FIG. 6 is a more simplified diagram that is drawn from a customer perspective. It shows the key components that a customer cares about. It contains a core router (identified as element 310), a management system (identified as element 311), an edge router (identified as element 312), a firewall (identified as element 313), and a customer network (identified as element 314). The other components that are important from an ISP perspective are not important to individual customers.

Figure 7:
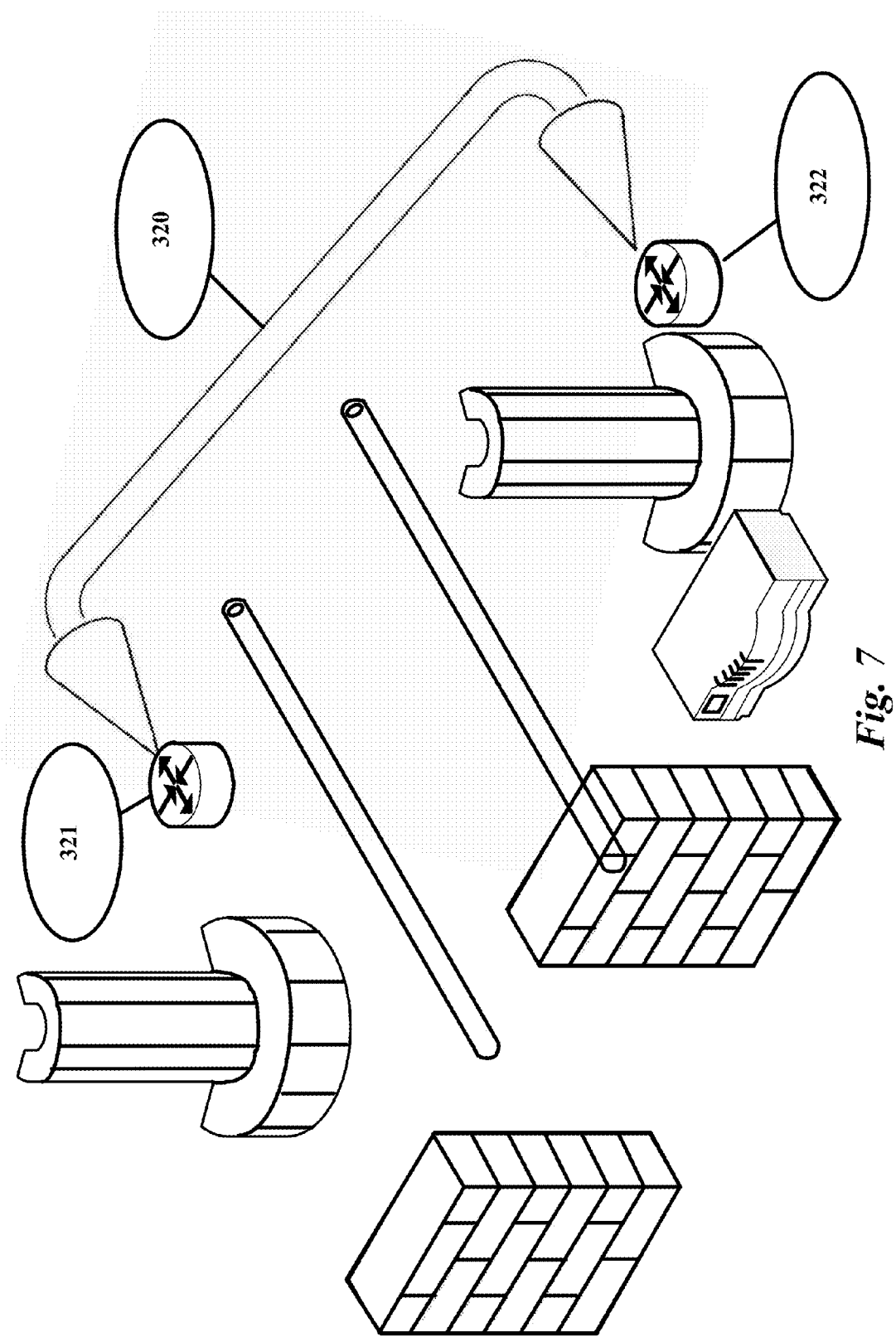
FIG. 7 The figure shows an ISP creating a private tunnel between data centers. All traffic is between two ISP core routers and the tunnel represents the total private capacity of the system between data centers.

FIG. 7 shows how a communications "tunnel" (identified as element 320) is set up between management systems of ISPs that have licensed the technology. It provides a maximum capacity that all of the customer can establish their own private connections. Notice that all communications go thru a Core Router (identified as element 321).

Figure 8:
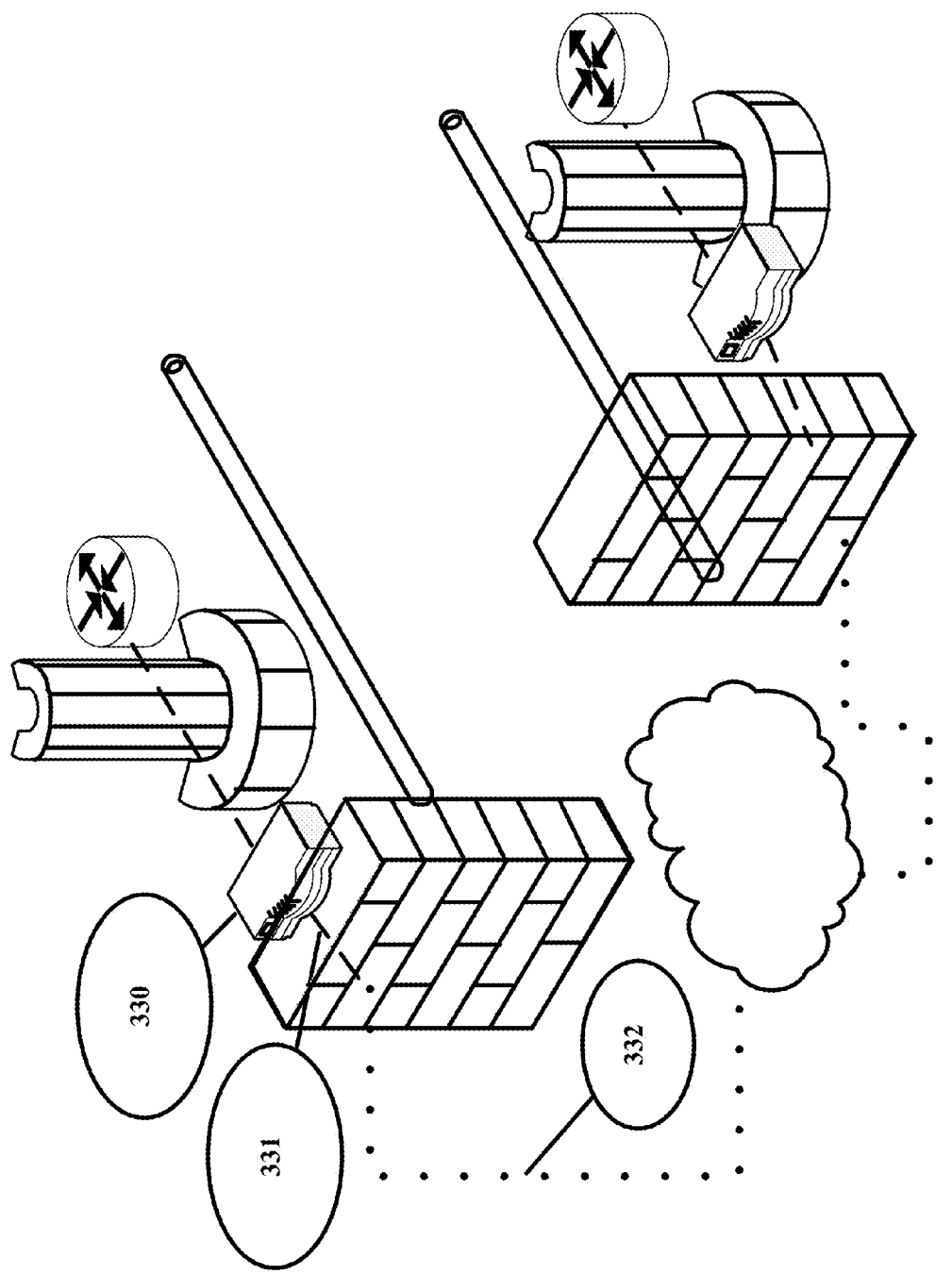
FIG. 8 This figure shows that all ISP communications via the internet go thru a core router first, then an edge router, then a firewall, and finally the internet.

FIG. 8 shows how multiple management systems can communicate over the internet by sending communications thru their core router to the edge router (identified as element 330), thru the firewalls (identified as element 331), and encrypted over the internet via their network (identified as 332).

Figure 9:
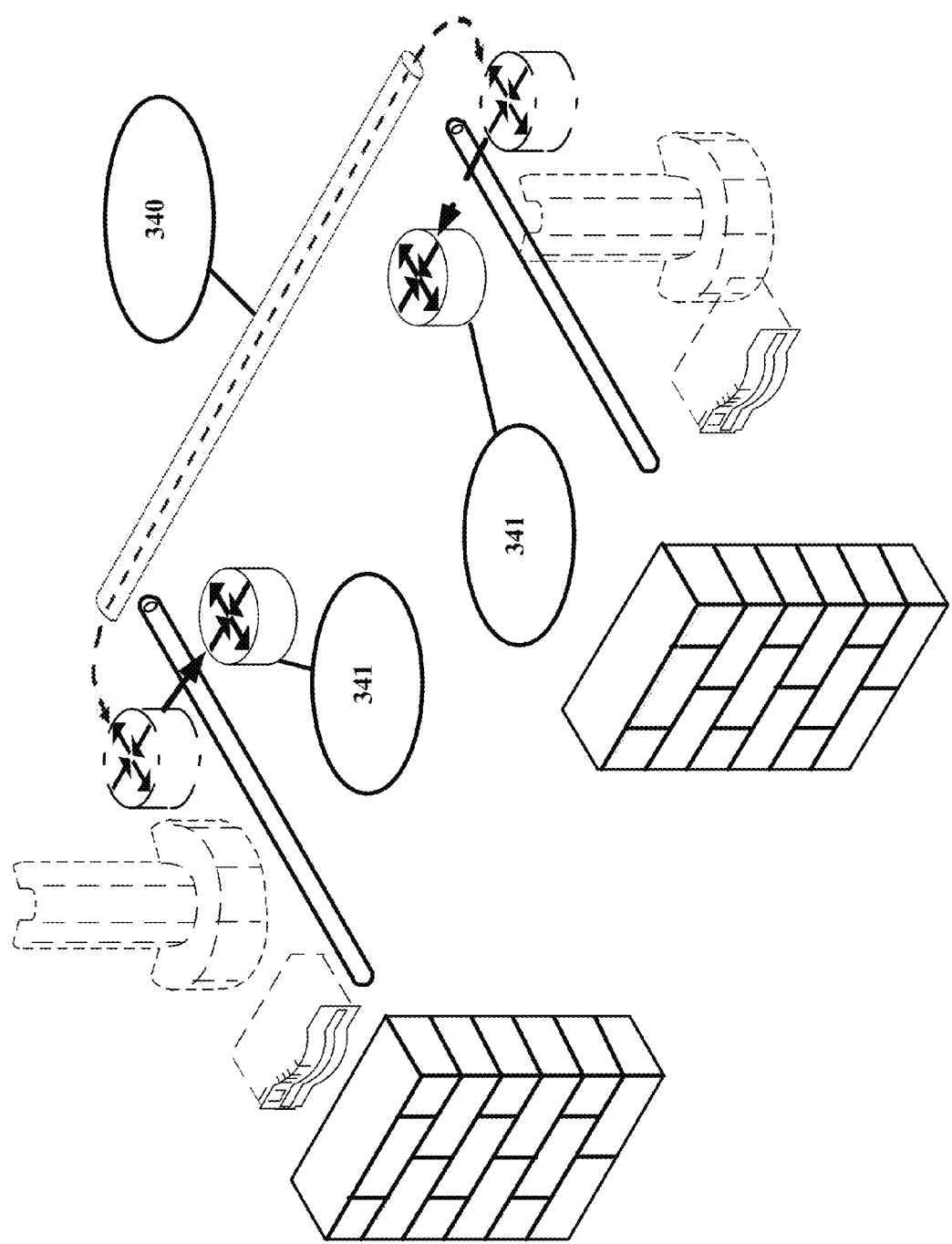
FIG. 9 The figure shows a that a particular customer may utilize via their own network core routers between management systems without the need to transverse the internet.

FIG. 9 shows a similar picture to FIG. 7, but the drawing is from a customer perspective and it shows the key components the customer can instantiate. It shows a customer Core router (identified as element 341) and a particular customer's private network (identified as element 340) going thru the ISP tunnel. It also shows that if the customer chooses to instantiate a core router, he can communicate with other data centers (physical or virtual) thru their tunnel allowing the customer to set up a very private communication channel to his other data centers without having to transverse the internet at a size of bandwidth that he chooses up to the maximum set by the size of the ISP's tunnel. It is obvious to one skilled in the art that the system can be used for disaster recovery. Disaster Recovery is also built in rather than added on, so it costs the customer only what is required for the customer to set up a duplicate data center for the portions of his business that require disaster recovery.

Figure 10:
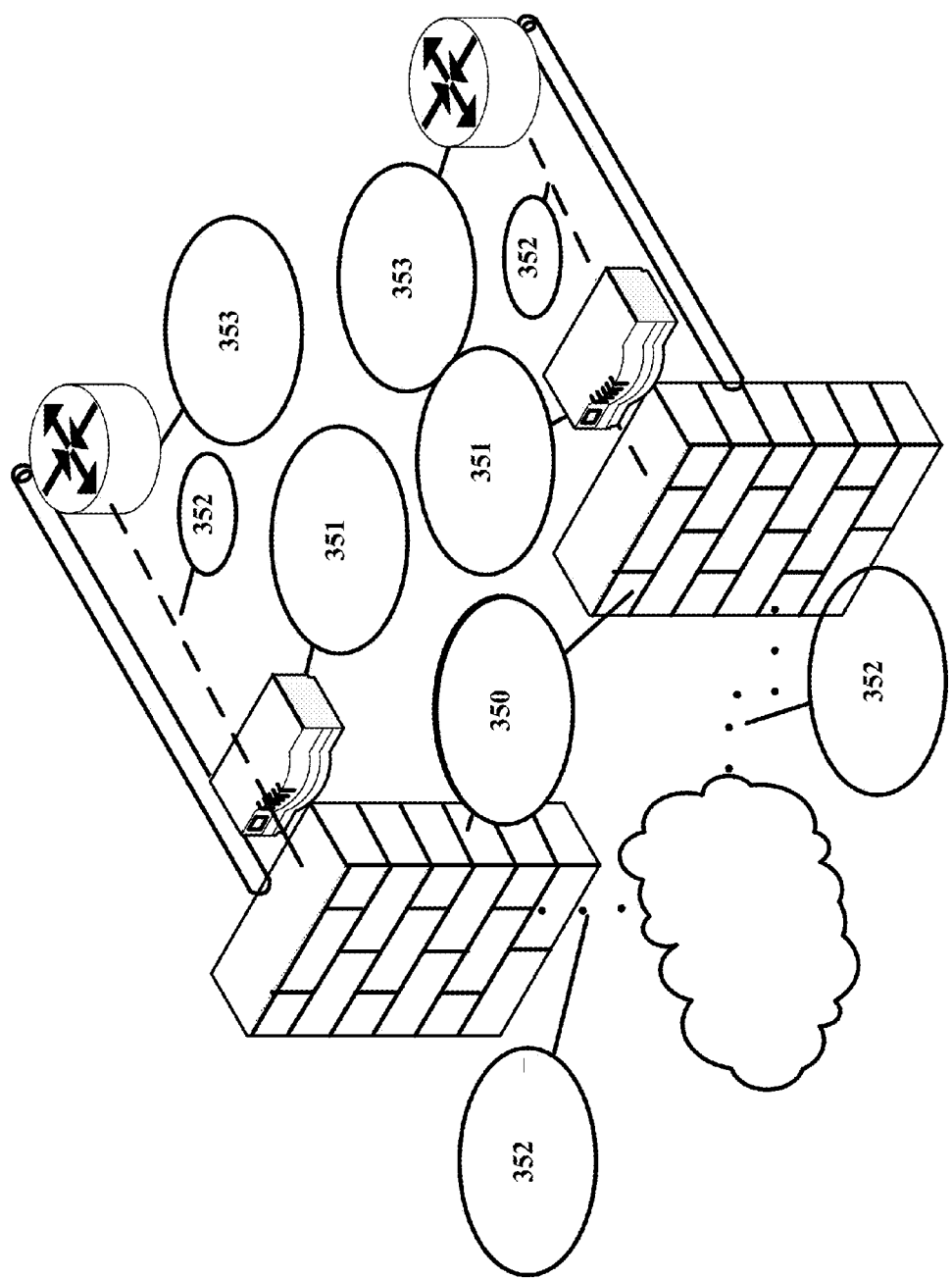
FIG. 10 The figure shows a customer network that utilizes the ISP to instantiate virtual core routers and edge routers, a virtual firewall, and communications via the internet.

FIG. 10 shows a similar picture to FIG. 8, and the drawing is also from a customer perspective and it also shows the key components the customer can instantiate. A customer firewall (identified as element 350), a customer edge router (identified as element 351), a customer network (identified as element 352), and a customer core router have to be created. FIG. 10 divulges how a customer's data can be broadcast over the internet to achieve the low cost of the internet while maintaining the privacy, security, and isolation that is inherent in his virtual data centers. It also shows multiple customers that are completely separate from each other by design.

Figure 11:
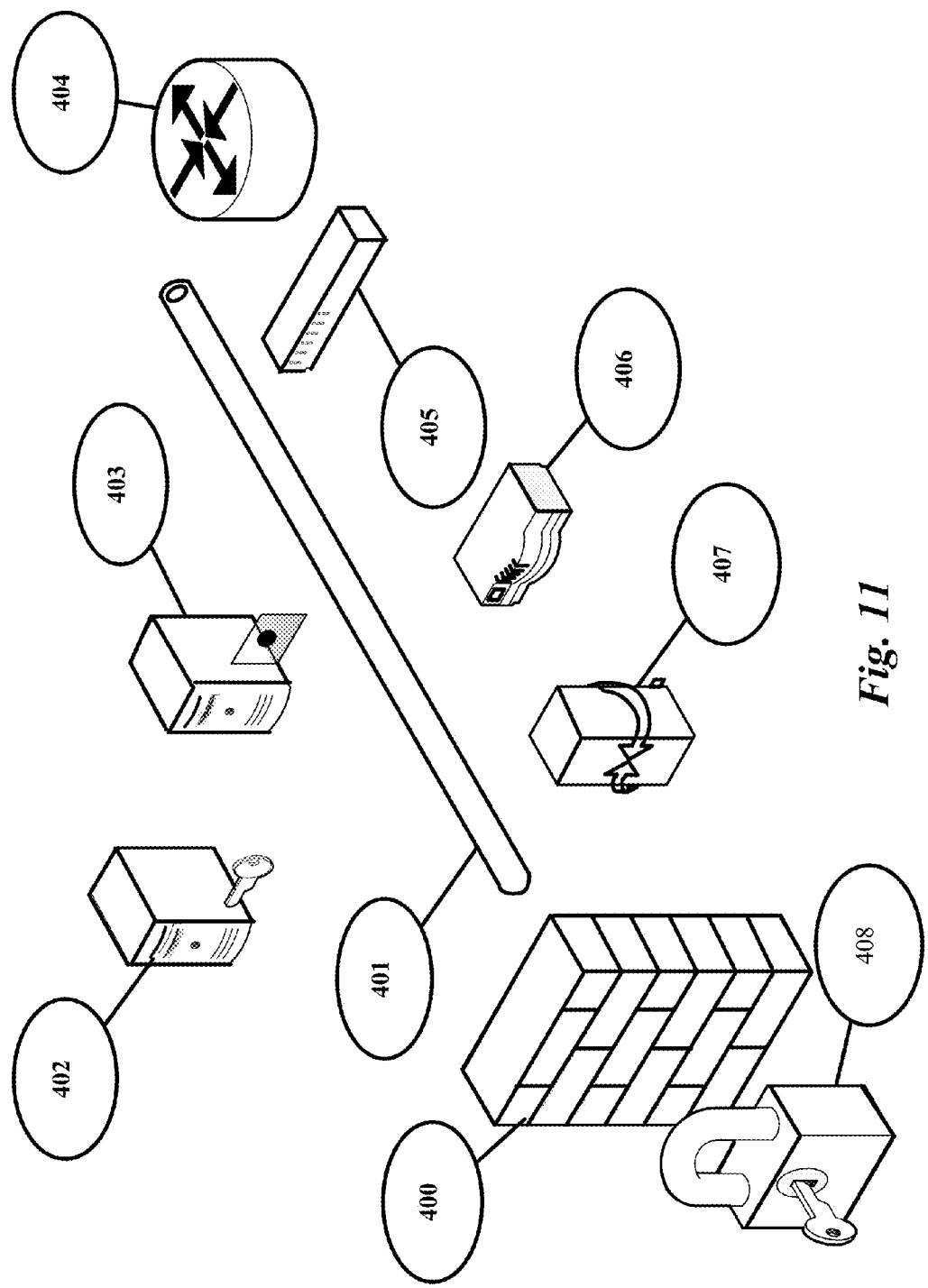
FIG. 11 The drawing demonstrates, from an ISP system perspective, several key network components provided by the ISP so that their customer can create a virtual or physical network.

FIG. 11. FIG. 11 identifies the key components necessary for implementing Software Defined Networking by an ISP that license the technology. It consists of a firewall (identified as element 400), a management network (identified as element 401), a private/isolated key server, analogous to a public/private key server (identified as element 402), a certificate server for issuing, encrypting, decrypting, and revoking certificates (identified as element 403), a core router (identified as element 404), a layer 2 ethernet switch (identified as element 405), an edge router (identified as element 406), and an Autonomous Number System (identified as element 407) to control the routing that occurs over the internet, RPKI information, and the RPKI XML method of transmitting this data (identified as element 408).

Figure 12:
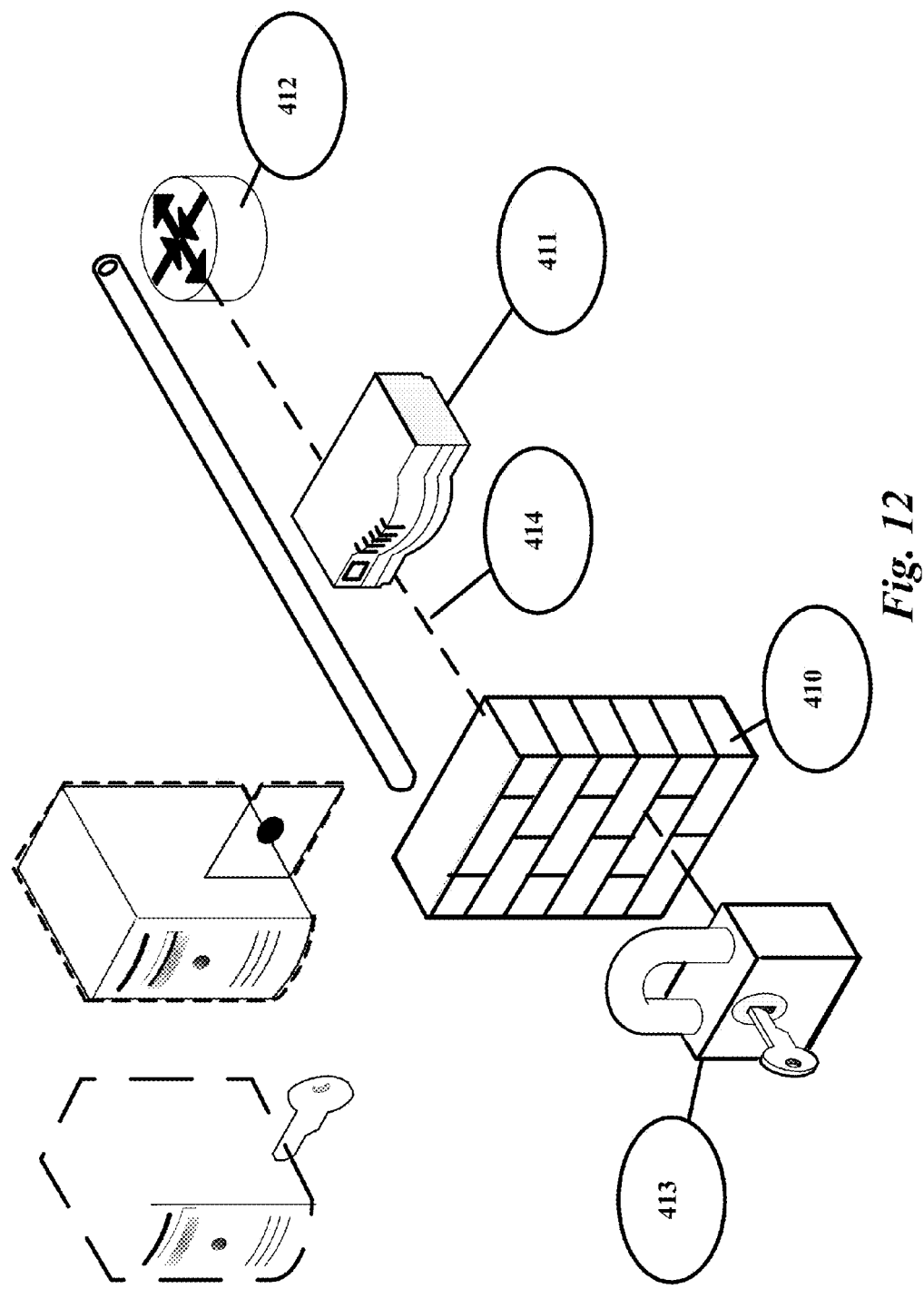
FIG. 12 The drawing demonstrates, from a customer perspective, several key network components that are available to the customer to create a Software Defined Network. A person who is skilled in the art will recognize that there are many other network components available (such as load balancers) and that this is a simplified example.

FIG. 12. The drawing shows a typical Software Defined Network from a customer perspective. It utilized the key components identified in FIG. 11 and produces a new software defined LAN utilizing these key components. The components are a customer firewall (identified as element 410), a customer edge router (identified as element 411), a customer core router (identified as element 412), a RPKI XML method (identified as element 413), a customer network (identified as element 414).

Figure 13:
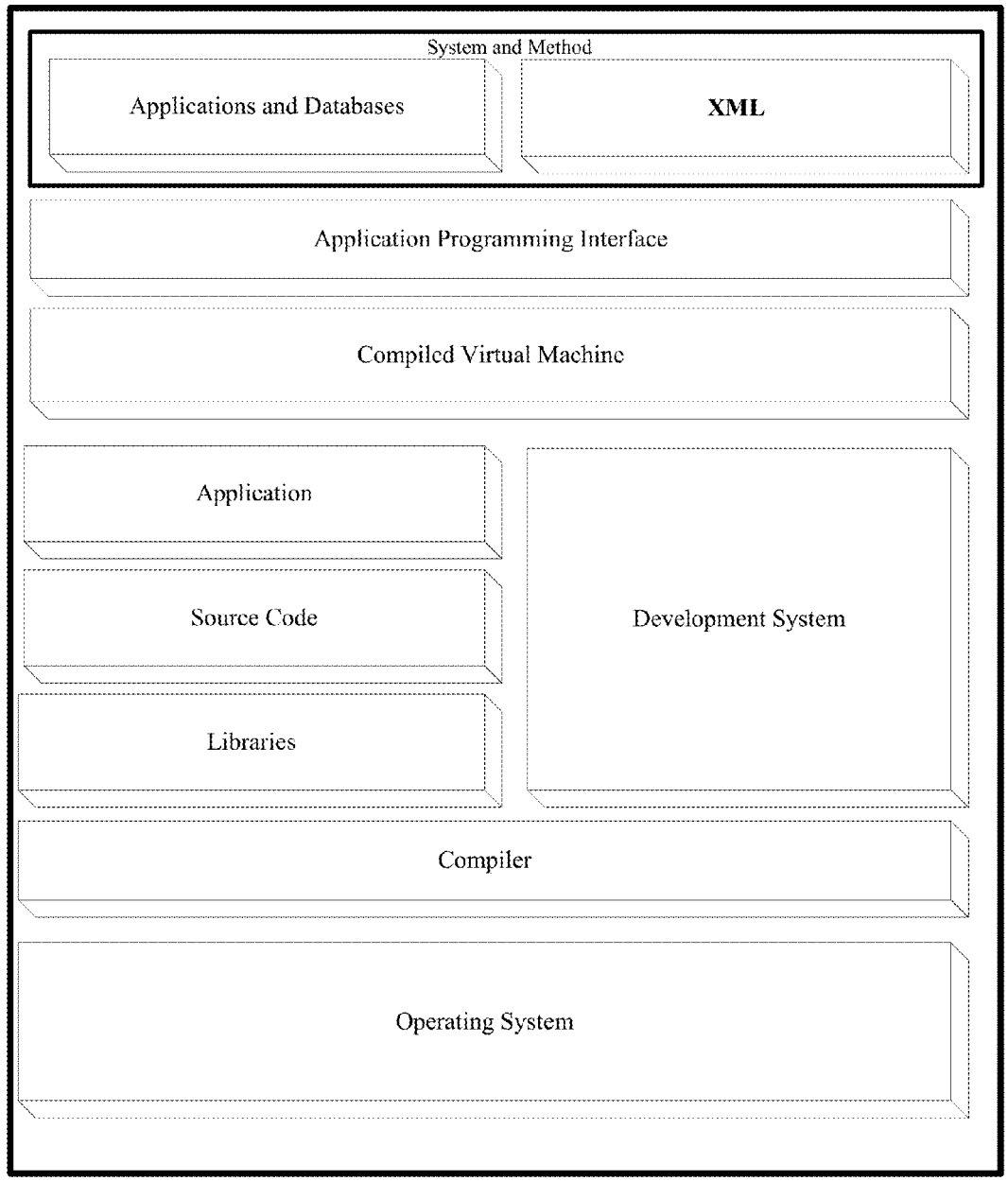
FIG. 13 The drawing shows how the Certificate System interacts with the other components to enhance security. It also identifies a Hardware Security Module that is accessed by the Certificate system that supplies the timing between Regional Internet Registrars and the location (in a manner analogous to GPS) of the RIR's HSM.

FIG. 13. A proprietary, innovative certificate system that has traceable, verifiable Trust is necessary. The Certificate system also discloses that included is access to several Regional Internet Registrar's Hardware Security Module, which serves as a timing source for applications such as VOIP, databases, etc. The information from the Hardware Security Module at each RIR provides the timing and a method of keeping each packet in sync with each other across the globe. This is useful for systems that require accurate timing such as data bases and VOIP systems. The current Hardware Security Module (HSM) at each RIR is capable of between 1,000 to 5,000 encryptions per second. The system would only need one very accurately timed packet to be encrypted and sent to multiple management systems to keep the system clocks in sync. Multiple RIRs would furnish highly accurate timing information periodically (every second or couple of seconds) that would state how many "clock ticks" of the Hardware Security Module had occurred since the last transmittal.

Typical RIR acronyms are ARIN for North America, RIPE for Europe, APNIC for Asia, LANIC for Latin America, AFRINIC for Africa. It is also disclosed that the precise physical location is provided in a manner analogous to GPS for every packet that generated or transmitted by the system, which is why it needs encryption with its own certificate per customer is necessary and important. The results of where the packet originates is also highly proprietary. This information may or may not be stripped off in the management system and is a separate feature that may be offered to some customers. The key components are identified as a unified system and method for Applications and Databases utilizing XML, an Application Programming Interface (API), a compiled virtual machine, the application, source code, and libraries that create the compiled virtual machine, the development system that is needed by the application, source code and libraries, a compiler or compilers, and an operating system.

Figure 14:
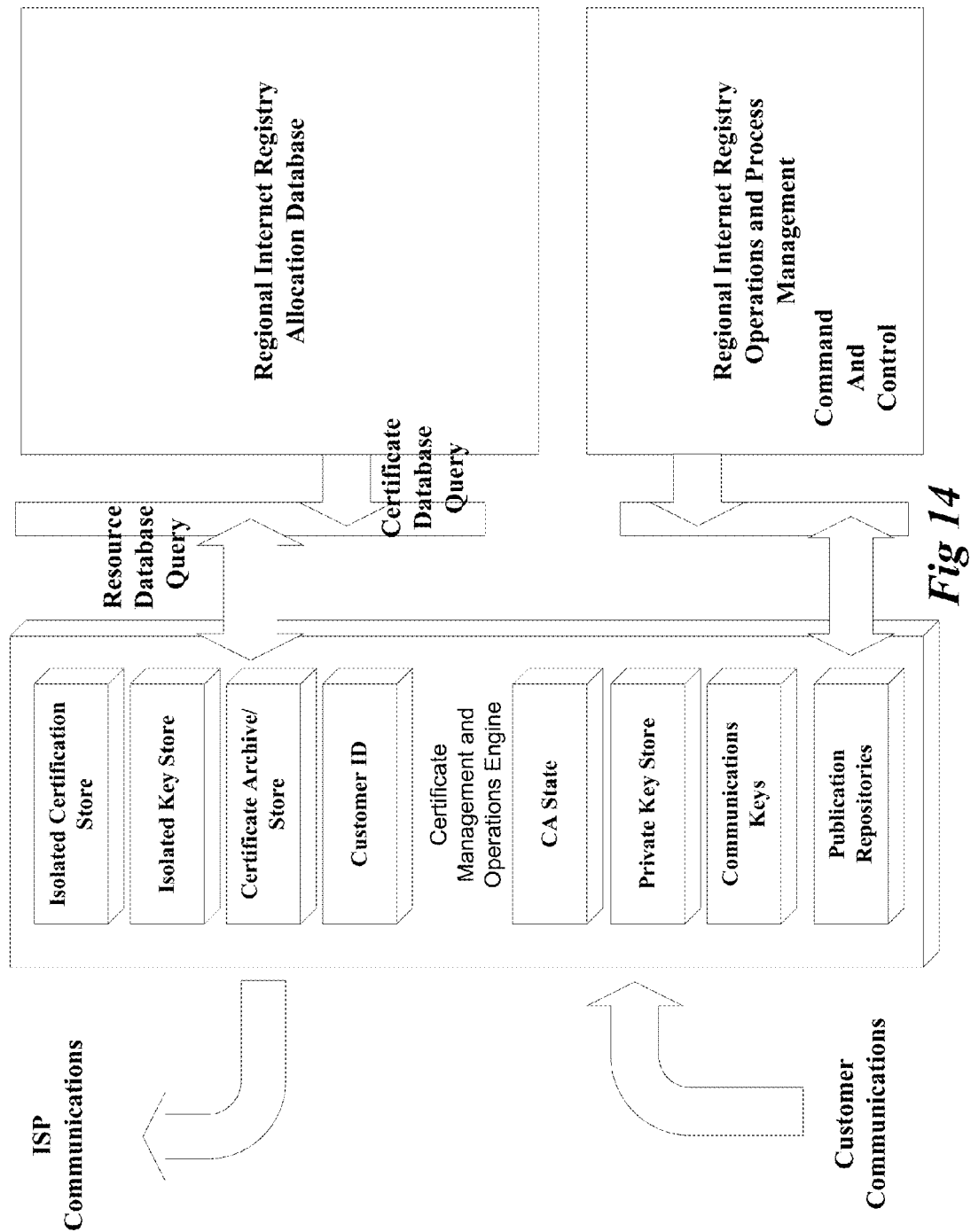
FIG. 14 The drawing shows the RPKI system.

FIG. 14. Resource Public Key Infrastructure (RPKI) will be used via duplication, although instead of a public/private key, it is disclosed that it is more similar to a private/isolated key. RPKI is used to allow standard routing BGP (BackGroundProtocol) to function properly. The Resource Certification (RPKI) system allows all resource holders to request a digital certificate listing the Internet number resources they hold. It offers validatable proof of holdership of a resource's registration by a Regional Internet Registry (RIR). The components that are identified on the drawing are customer requirements for information and ISP requirements for information. The customer requirements for a certificate system are the CA State, a private key store, communications keys, and publication repositories. These are sent to a particular Regional Internet Registrar (or the ISP) for validation of the network elements (IP addresses) and the network path. The ISP requirements for a certified certificate system are a isolated certification store, an isolation key store, a certificate archive/store, and a customer ID. This is used to communicate with a particular RIR thru a DMZ. From this communication, the RIR looks at the database of permissible allocations in its region.

Figure 15:
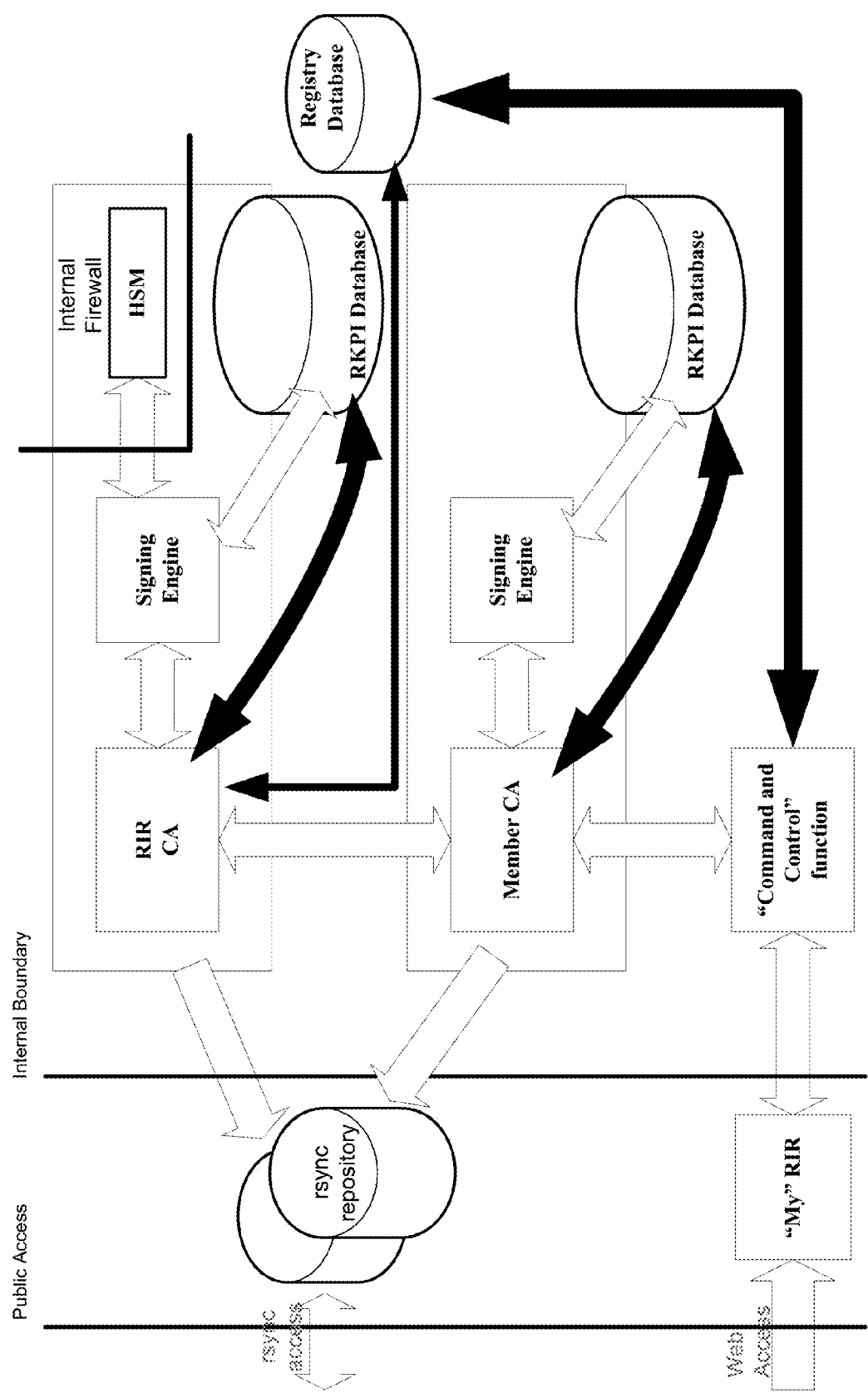
FIG. 15 The drawing shows the RPKI XML method.

FIG. 15. Resource Public Key Infrastructure XML (RPKI XML) is the method that is used for the RPKI infrastructure to interact with each RIR and existing networks so that hardware that is sourced by the ISP has a standard API to utilize. It is coordinated with FIG. 14, but it shows additional details that each customer, ISP, and Regional Internet Registrar have to make the system and method possible. The components that are utilized to manage certificates and keys that are utilized are web access (normally via https) to a pseudo-application that is called "MyRIR" in this example between a RIR and its customer. The ISP utilizes "rsync" access. There is a separate DMZ maintained by the RIR that provides access for both the customer and ISP to the RIR's private information. It allows for public access and has an internal boundary. The information available to each RIR to the "MyRIR" application is the "command and control" function of each RIR. The information of the "Command and Control" function are member Certificate Authorization and the Certificate Registry Database as well a bidirectional information to each customer thru the "MyRIR" application and the DMZ. The Member Certificate Authorization has bidirectional communications with a Member Signing Engine, a Member RPKI Database, and a RIR Certificate Authorization. The Member Signing Engine had bidirectional information between both the Member Certificate Authorization and the Member RKPI Database.

Each ISP is also provided with an application "rsync" access to information in each RIR's DMZ. The "rsync" application obtains bidirectional information from the Member Certificate Authorization and the RIR Certificate Authorization. The RIR Certificate Authorization has bidirectional communications with a RIR Signing Engine, a RIR RPKI Database, and a RIR Certificate Authorization. The RIR Signing Engine had bidirectional information between both the RIR Certificate Authorization and the RIR RKPI Database. There is also an internal Firewall at each RIR and a Hardware Security Module that has bidirectional access thru the firewall to the RIR Signing Engine. There is a Registry Database that has bidirection information requirements from both the customer's Command and Control function and the RIR Certificate Authorization.

It is also disclosed that the occurrence and timing of this transition is completely hidden and private between the Intranet Service Provider (ISP) and the customer/private network. This system and method allows the customer's private network to be completely encapsulated and thus not available for internet surveillance, providing the required level of isolation and security. It is not necessary to broadcast information regarding the private network's IPv4/IPv6 transition over the internet (encrypted or not). The required routing information is provided by broadcasting permissible routes to AS numbers. In order to accomplish this while still interoperating with the Regional Internet Registrar's standards this system or method provides for a subset of the information to be made available on the internet. This is accomplished by using a private instance of the Resource Key Public Infrastructure and feeding only the required information to the Regional Internet Registrar. For example, ARIN (the US-based Internet Naming Authority for the Americas Northern Hemisphere) has a hosted solution for providing an encrypted version of this routing information, which is as secure as possible using today's technology. The Up/Down interface is used by the Regional Internet Registrars to tell which routes are "up" and "down". Access to this information and interface is provided for compatibility with existing standards.

All information regarding the status and progress of the IPv4-IPv6 transition is completely proprietary to a customer. If a competitor were to gain access to this information, they would be able to deduce which applications are "legacy" and incapable/uneconomical to migrate and which were in the process of transition. They would then be able to use this information to gain an unfair competitive advantage. The control of the transition has to be under customer direction and guidance. Since the IPv4 addresses from the customer will be sold to the highest bidder, it will have to meet the business needs of the customer.

As shown in FIG. 3b and FIG. 4a, the customers' applications must be able to properly use "gethostbyaddress32" and "gethostbyaddress128" library calls. The preferred method to address this is to have "gethostbyaddress" migrated either by recompiling the source code to a new library provided by the Operating System or by direct binary substitution. Where the source code is not available or it is uneconomical to provide a direct substitution, there is a legacy capability built in that utilizes both IPv4 32 bit "gethostbyaddress32" library calls (without the larger addressing possible) and IPv6 128 bit "gethostbyaddress128" library calls for applications that support the larger addressing range. This dual capability will exist as long as the customer has legacy applications and it is economically viable for the ISP to support dual capabilities/libraries. The library "gethostbyaddress" must provide valid and correct information for both cases. Every Virtual Machine in the library must provide this capability and any Virtual Machines that are imported into the system must include both copies or it will be automatically a "legacy" 'gethostbynames32' without the extended addressing capabilities.

Although the background of facts for this invention are well known to anyone skilled in the art, there is also a unique insight that has been disclosed for a potential solution to this well known and global problem. It has been known for some years that the world is running out of IPv4 addresses. IPv6 has been in existence for ~15 years (as of the writing of this patent application) as a replacement for IPv4, but it hasn't gotten any traction because there is no incentive to change. Recently, in the last few years, IANA has decided to use economic incentive (or it should be said economic 'disincentive') because the price projected for new IPv4 addresses is planned to rise. For the transition between the old (IPv4) and new (IPv6) IP addresses, the price of existing IPv4 addresses will need to rise also. Credit will be given to IANA and the Regional Internet Registrars for the very tough job of creating a market and developing policies and procedures to regulate a market and coming up with an approach to solving the basic problem of the world running out of IPv4 addresses. The IPv4 addressing scheme was invented back in the early 1980s and has lasted a very long time. IANA, IETF and the Regional Internet Registrars who look at the allocation of IPv4 addresses on a daily basis knows that the world will eventually have to transition to IPv6 and are taking the steps that they see need to be taken and are committed to a very innovative but tough approach of yanking the old tooth out before a new one can be put in the same place.

Likewise, insight was available because of the extreme pain rendered years ago when the IPs changed (from one set of IPv4 addresses to another). Now, this is very specialized knowledge, but someone skilled in the art knows about this potential pain from an outage of transition between IP addresses. Several steps have been taken by the industry since the internal outage years ago, but those with a few gray hairs knows about this potential outage and it may have even caused a few gray hairs along the way. Many of the younger generation skilled in the art haven't experienced this because of the knowledge that has been garnered and processes that have been put in place to mitigate this circumstance. It would take someone who was very skilled in the art to recognize there is a potential problem because even years ago, it wasn't a well known problem except to a very few individuals.

So the first step is to recognize that there is a potential problem. The solution to this problem is non-obvious and requires an understanding of software, an understanding of hardware interfaces and software drivers, an understanding of networking, and an understanding of how systems operate to even conceive of the elegant but simple solution that is disclosed.

If both IPv4 and IPv6 addresses are allocated at the same time, with a system of coordination of these addresses which can control the routing, and have a method of issuing both IPv4 and IPv6 addresses to allocate, then the benefits of this solution can be available. The benefits include: 1) no outage on transition to a new network addressing system 2) the ability to recycle the original IPv4 address to a new network 3) a secure list of applications for the customer that highlight which applications are legacy and which can be transitioned to the wider addressing capability of IPv6 4) a means to transfer the legacy IPv4 addresses and receive some remuneration to the owner of the IPv4 addresses for this effort at market prices that is built in 5) a pure IPv6 network rather than the kluge planned of utilizing existing IPv4 addresses inside of an IPv6 "tunnel" 6) the timing necessary for this transition will be "per customer" and will be controlled by their schedule rather than an outside force dictating that it should occur all at once at a given time.

Also disclosed is the routing necessary to effect this change and the security of knowing that it will not be disclosed to an outside party.

There are several unique components needed to control the routing. The end effect of an IPv4 to IPv6 address transition without an outage is like the "skin". There are several things required to make this transition possible besides the skin that is novel and unique. The current embodiment of a solution is 1) a core router under control of the customer that allows his data to transition to a new data center at a different location 2) a 'software defined network' virtualizing common network components so that a customer can be totally isolated and secure 3) a unique certificate system for encryption 4) timing information from each of the Regional Internet Registrars that is combined to provide a timing source for a particular physical data center which is integrated with the Certificate system and several of the Regional Internet Registrar's Cryptographic system 5) an RPKI validation of the data 6) RPKI XML for a method of decoding the data.

The core router can be either physical or virtual. The customer will have access to creating his own core router. The core router will only be able to transmit packets to a data center that has the components necessary to provide a transition from IPv4 to IPv6 without an outage or to an edge router within the data center that can then transfer the information (encrypted by default) thru a customer's firewall and onto the internet. The internet is used as a transport mechanism and other transport mechanisms can be other systems and methods besides the internet.

The other networking components for a software defined network will also be available for the customer to create their own virtual network available to each customer and allowed to join the customer's network that the customer creates. The key components from a customer perspective are a software defined core router, a software defined edge router, and a firewall (physical or virtual). It will be noticed by someone skilled in the art that other components such as load balancers and other appliances can be made available too, but these will not be described for simplification.

Since the network deployment is "software defined networking", a unique module that controls the allocation of IPv4 and IPv6 addresses, controls both of the IP address registers and the allocation of the software library call "gethostbyname" to each register on a "per customer/per network" basis, and reports an ongoing status to the customer/network for both the IP address allocation and software library status is disclosed. The sequence of operations will be to deploy both the IPv4 and IPv6 addresses at the same time with the gethostbyname32 pointing to the IPv4 register and the gethostbyname128 pointing to the IPv6 register, change the gethostbyname library calls to only access the IPv6 register, de-allocate the IPv4 register, and differentiate which application/database is using the gethostbyname32 vs. the gethostbyname128. Since this will be done on a "per device" basis, it will be under the control of the customer/network. It will be under customer control to decide if this is to be implemented in their virtual data center only, their datacenters only, or throughout their organization including the desktops and mobile devices. The system and method can be achieved in "chunks" with the required timing and deployment under the control of the customer/ network.

The certificate system will work in a manner that is analogous via two key PKI encryption (public/private) but the keys will be private/isolated. The similar to a public key (the private one in the new system) is known only to particular customer and the isolated one is encased in a "black box" inside the management system of the data center, where it is unknown to all parties, even the operator of the data center. Unlike conventional systems, when the key is compromised it will be simpler to provide new keys. This is analogous to providing a new set of keys and changing the lock rather than replacing the entire strongbox. Every packet of information will be encrypted with this set of keys, whether the information is transmitted over the internet or is transmitted to a different data center with the same capabilities.

It should be noticed that so far, the ingredients have been disclosed but the systems and methods necessary have not been disclosed (with the exception of sync timing). This is similar to having the ingredients for a cake specified but no recipe. The system and methods used will be disclosed in this description/specification and claims of uniqueness in this patent application document.

It would be obvious to anyone skilled in the art that the virtual and physical network interfaces will need to have the capability of having an IPv4 address and an IPv6 address stored at the same time in separate registers. It would also be obvious to anyone skilled in the art that the software call of "gethostbyname" will also need to be routed to the correct register, which implies that the virtual machine images will also need to have both library calls available (gethostbyname32 and gethostbyname128). It would also be obvious that both libraries will be used for quite some time, but the IPv4 address will be removed and deployed to a new network. The unique routing necessary to make these transitions happen will now be disclosed.

The heart of this system is the clock reference signal that provides a sync clock source from multiple Regional Internet Registrars. This is accomplished by utilizing the cryptographic system inherent in each Regional Internet Registrar and instructing the hardware in the Regional Internet Registrar to issue an encrypted packet or packets on a regular interval (approximately every 3 seconds per RIR) that contains a very exact and precise time the packet was generated. It will be contain a difference in time between the current packet and the last packet that was sent by the Regional Internet Registrar. Most packets will take the same path and take roughly the same time to reach the same destination (a particular data center). The location of the clock source is already very stable and known, so that the location of the original RIR packet is also known. For the case that either the RKPI system at a particular RIR moves, receipt timing is altered, or otherwise does not meet the historical guidelines, then that particular RIR's packet is disabled and a new request for an original packet is placed. The particular RIRs RPKI system will either respond or not, but it will still be disabled until it is approved to "join" with other RIRs in furnishing the encrypted time/sync signal. If a signal from a particular RIR interferes with a signal from another RIR, it is "backed off" a random amount of time when it will try again until it succeeds. When the RIR's packet is received by the data center(s), after a prescribed amount of transmissions, it is then allowed to "join" with other RIRs in providing a very precise clustered clock sync signal. This furnishes an equivalent of NTP without the need of GPS satellites to provide timing. The amount of "jitter" introduced by a particular Regional Internet Provider on a particular client data center will be measured at the local data center.

The certificate disclosed will be utilized with a sync clock time source. It is disclosed that a system and method will be used that is compatible with existing standards, but the isolated key which unlocks the packet is known by no one and is in an encrypted folder in the management system of the ISP and the contents are under the control of the customer. There will be a lot of transmitting, receiving, and signing that meets the standard and doesn't interfere with existing patents that are in force.

The practical application offered today is the ability to utilize resource certificates to help secure Internet routing, particularly BGP origin validation.

Resource Certification (RPKI) is a community-driven system in which all Regional Internet Registries, open source software developers and several major router vendors participate. It uses open standards that were developed in the Secure Inter-Domain Routing (sidr) Working Group in the IETF.

A resource certificate offers validatable proof of holdership of a resource's allocation or assignment by an RIR. Using their resource certificate, network operators can create cryptographically validatable statements about the route announcements they authorize to be made with the prefixes they hold. This is known as BGP Origin Validation.

It is disclosed in this patent application how to utilize RPKI information to provide validatable proof of the origination of the packet if it originated in a system and method that utilizes this patent. This disclosure is that a unique certificate will be utilized to issue, encrypt, decrypt, and obsolete any packet and that a Regional Internet Registrar must be licensed for this technology in order for the packet to be transmitted from the Regional Internet Registrar to the data center that also must be licensed for this technology.

There are about 550,000 route announcements on the Internet at the time of submission of this patent application. The most common routing error is the accidental mis-origination of a prefix, meaning someone unintentionally announces an IP prefix that they are not the holder of. RPKI offers BGP origin validation, so the question it tries to answer is:

"Is this particular route announcement authorized by the legitimate holder of the address space?"

RPKI allows network operators to create cryptographically validatable statements about the route announcements they authorize to be made with the prefixes they hold. These statements are called Route Origin Authorizations (ROAs).

A ROA states which Autonomous System (AS) is authorized to originate certain IP address prefixes. In addition, it can determine the maximum length of the prefix that the AS is authorized to advertise. Based on this information, other network operators can make routing decisions.

When a network operator creates a ROA for a certain combination of origin AS and prefix, this will have an effect on the RPKI validity of one or more route announcements. They can be:

VALID
  The route announcement is covered by at least one ROA
INVALID
  The prefix is announced from an unauthorized AS
  The announcement is more specific than is allowed by the maximum length set in a ROA that matches the prefix and AS
UNKNOWN
  The prefix in this announcement is not covered (or only partially covered) by an existing ROA The Resource Certification (RPKI) system consists of two parts:
1. Network operators use their certificates to create Route Origin Authorizations (ROAs), stating from which Autonomous Systems their prefixes will be originated and what the maximum allowed prefix length is
2. Other network operators can set their routing preferences based on the RPKI validity of route announcements when compared to the ROAs that were created Please note that the current RPKI functionality solely offers origin validation. However, it lays the foundation to offering true Secure BGP, including path validation. Work on creating the standards for this are currently being developed in the IETF.

RPKI XML is the method used to provide cryptographically valid routing information. At the time of submission of this patent application, RPKI XML is used for validation of addresses assigned by the RIR to the AS number of the ISP for purposes of BGP routing decisions. The unique and non-obvious difference is shown in the drawings.

CONCLUSION

Depending on the embodiment, certain acts, events, or functions may be substituted by someone who is sufficiently skilled in the art.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. No element or feature is necessary or indispensable to each embodiment. The scope of certain inventions disclosed herein is indicated by the appended claims rather than by the foregoing description. All changes which come within the meaning and range of equivalency of the claims are to be embraced within their scope.

The invention claimed is:

1. A method for achieving seamless transition of IPv4 addresses to IPv6 addresses, the method comprising:
  deploying, by an Internet Service Provider (ISP), at least an IPv6 address holding an IPv4 address and the IPv6 address simultaneously for allocating at least the IPv4 address or the IPv6 address to at least one customer in the network, wherein the IPv6 address maintains an IPv4 address register holding the IPv4 address along with an IPv6 address register holding the IPv6 address, and a software library call available for the IPv4 address is configured to utilize the IPv6 address register;
  migrating at least an application, used by the customer, utilizing the software library call available for the IPv4 address to utilize the software library call available for the IPv6 address;
  enabling, after migration, transition of the IPv4 address to the IPv6 address and routing of the data and calls based on the transition achieved.

2. The method as claimed in claim 1, wherein the software library call for IPv4 address comprises "gethostbyaddress32" call, and the software library call for the IPv6 address comprises "gethostbyaddress128" call.

3. The method as claimed in claim 2, wherein "gethostbyaddress128" call and "gethostbyaddress32" call utilizes the IPv6 register.

4. The method as claimed in claim 1, wherein upon migration, the application is configured to use both the IPv4 register and the IPv6 register.

5. The method as claimed in claim 1, wherein upon migration, the IPv4 address is available for re-use and/or reallocation to at least a new customer available in the network.

6. The method as claimed in claim 1, wherein upon migration, further comprises using both "gethostbyaddress32" (IPv4) and "gethostbyaddress128" (IPv6) library call.

7. The method as claimed in claim 1, wherein the IPv6 address holds the IPv4 address register and the IPv6 address register simultaneously.

8. The method as claimed in claim 1, further comprises routing the data/calls based on the transition achieved.

9. The method as claimed in claim 1, before migrating, the method further comprises:
    differentiating which applications or databases hosted by the customer based on utilization of the IPv4 software library call or the IPv6 software library call to service calls to provide a host name by address; and
    providing a list of applications or databases to the customer that highlight which applications or databases may be transitioned to use the IPv6 address.

10. A method for achieving seamless transition of IPv4 addresses to IPv6 addresses, the method comprising:
    detecting, by an Internet Service Provider (ISP), one or more IPv4 addresses and one or more IPv6 addresses available for allocation to at least one customer in the network;
    maintaining an IPv4 address register and an IPv6 address register for the IPv4 addresses and the IPv6 addresses detected;
    allocating the IPv4 address and the IPv6 address at a defined portion of an address field of an IPv6 packet header;
    matching the IPv4 address registers and IPv6 address registers, available on the network at the same time, based on a software library call available on the IPv6 address thereby enabling the IPv4 address registers to use the IPv6 address;
    migrating at least an application utilizing a software library call available in the IPv4 address to utilize the IPv6 address and a software library call available in the IPv6 address, to achieve transition of the IPv4 addresses to the IPv6 address; and
    routing the data and/or calls based on the transition achieved.

11. The method of claim 10, wherein, matching further comprises allocating a software library call available in the IPv4 address to the IPv6 address register matched and thereby removing the IPv4 address register from the IPv4 address.

12. The method of claim 10, wherein matching the IPv4 address registers and IPv6 address registers is based on "gethostbyname32" call.

13. The method of claim 10, wherein, migrating further comprises the software library call, "gethostbyaddress32" call, available in the IPv4 address to utilize the IPv6 address and the software library call, "gethostbyaddress128" call available in the IPv6 address.

14. The method of claim 10, wherein, migrating further comprises allocating, based at least one a routing information, the software library call, "gethostbyaddress32" call, of the IPv4 address to the IPv6 address register, and thereby de-allocating the IPv4 address register.

15. The method of claim 10, wherein, migrating further comprises recompiling at least a source code of the application to utilize the software library call, "gethostbyaddress128" call, available on the IPv6 address.

16. The method of claim 10, further comprises routing based on at least a routing information provided by broadcasting permissible routes to at least an autonomous system (AS) numbers, wherein the permissible routes utilizes a private instance of a Resource Key Public Infrastructure to broadcast the routing information pertaining to the transition achieved to a Regional Internet Registrar.

17. The method of claim 10, wherein, migrating the application to utilize the software library call available on the IPv6 address, comprises:
    recompiling a source code of the application to the software library call available on the IPv6 address provided by an operating system (OS); and
    substituting using a direct binary substitution.

18. The method of claim 10, further comprises:
    using the IPv4 software library call to provide the host name address for applications that only support IPv4 addressing; and
    using the IPv6 software library call to provide the host name by address for applications that support IPv6 addressing.

19. The method as claimed in claim 10, before migrating, the method further comprises:
    differentiating which applications or databases hosted by the customer based on utilization of the IPv4 software library call or the IPv6 software library call to service calls to provide a host name by address; and
    providing a list of applications or databases to the customer that highlight which applications or databases may be transitioned to use the IPv6 address.

20. A method for achieving seamless transition of IPv4 addresses to IPv6 addresses, the method comprising:
    allocating one or more IPv4 addresses and one or more IPv6 addresses at same time with a gethostbyname32 pointing to an IPv4 register and a gethostbyname128 pointing to an IPv6 register;
    changing the gethostbyname32 library calls to specifically access the IPv6 register and deallocating the IPv4 register; and
    migrating at least an application utilizing the gethostbyname32, a software library call, to utilize the gethostbyname128, a software library call, to achieve transition of the IPv4 addresses to the IPv6 addresses.

21. The method as claimed in claim 20, further comprises allocating the software library call to the IPv4 address register and the IPv6 address register by pointing a gethostbyname32, the software library call, to the IPv4 register, and a gethostbyname128, the software library call, to the IPv6 register.

22. The method as claimed in claim 20, wherein after deallocating the IPv4 register, the method further comprises reusing the IPv4 address associated with the IPv4 deallocated.

23. The method as claimed in claim 20, further comprise routing the data/calls based on the transition achieved.

24. The method as claimed in claim 20, before migrating, the method further comprises:
    differentiating which applications or databases hosted by the customer based on utilization of the IPv4 software library call or the IPv6 software library call to service calls to provide a host name by address; and providing a list of applications or databases to the customer that highlight which applications or databases may be transitioned to use the IPv6 address.

25. The method as claimed in claim 20, further comprises ceasing to utilize the IPv4 register after the software library has migrated to use the IPv6 address, wherein the ceasing includes re-allocating an IPv4 software library call to use the IPv4 address located within the IPv6 register.

* * * * *

UNITED STATES PATENT AND TRADEMARK OFFICE
CERTIFICATE OF CORRECTION

PATENT NO. : 9,479,475 B1
APPLICATION NO. : 14/658241
DATED : October 25, 2016
INVENTOR(S) : Michael E. Mazarick Page 1 of 1

It is certified that error appears in the above-identified patent and that said Letters Patent is hereby corrected as shown below:

IN THE SPECIFICATION

Parent Case Text Lines 1 thru 7 should be entirely deleted. They read:

"Parent Case Text

CROSS REFERENCE TO RELATED APPLICATIONS

The present application claims the benefit of U.S. Provisional Patent Application No. 61/954,231 filed Mar. 17, 2014 by Michael E. Mazarick and entitled "System and Method for IPv4 to IPv6 Transition Rather Than Outage" which is incorporated herein by reference as if reproduced in its entirety."

Signed and Sealed this
Sixth Day of December, 2016

Michelle K. Lee
*Director of the United States Patent and Trademark Office*